2 Sheets--Sheet 1.

C. A. GRISWOLD.

Improvement in Skirt Supporting Corsets.

No. 4,427. Reissued June 20, 1871.

Witnesses:

Thos. H. Dodge

Mary Cockell

Inventor:

Catherine A. Griswold

A.M. PHOTO-LITHOGRAPHIC CO. N.Y. (OSBORNE'S PROCESS)

2 Sheets--Sheet 2.
C. A. GRISWOLD.
Improvement in Skirt Supporting Corsets.
No. 4,427. Fig. 3 Reissued June 20, 1871.
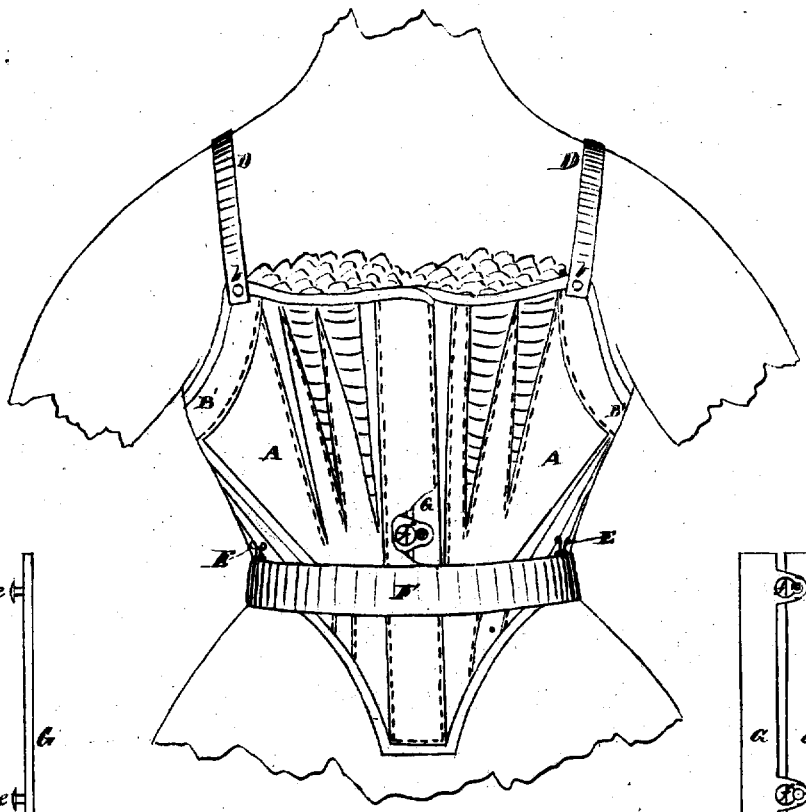
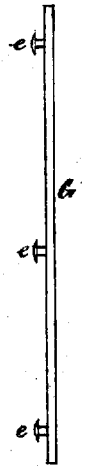
Fig. 5
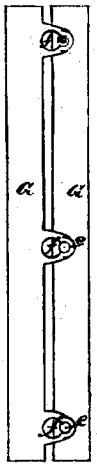
Fig. 4
Witnesses:
Thos. H. Dodge
Mary Cockell
Inventor:
Catherine Allsop Griswold
AM. PHOTO-LITHOGRAPHIC CO. N.Y. (OSBORNE'S PROCESS.)

UNITED STATES PATENT OFFICE.

CATHRINE ALLSOP GRISWOLD, OF WILLIMANTIC, CONNECTICUT.

IMPROVEMENT IN SKIRT-SUPPORTING CORSETS.

Specification forming part of Letters Patent No. 56,210, dated July 10, 1866; reissue No. 4,427, dated June 20, 1871.

*To all whom it may concern:*

Be it known that I, CATHRINE ALLSOP GRISWOLD, of Willimantic, in the county of Windham and State of Connecticut, have invented certain new and useful Improvements in Back and Skirt Supporters; and I do hereby declare that the following is a full, clear, and exact description of the same, reference being had to the accompanying drawing forming a part of this specification, in which—

Figure 1:
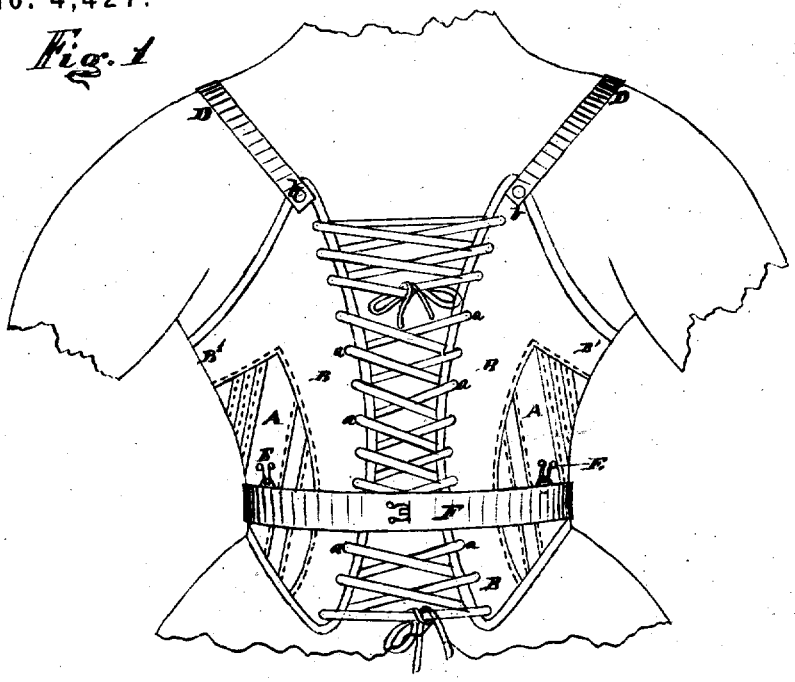
Figure 2:
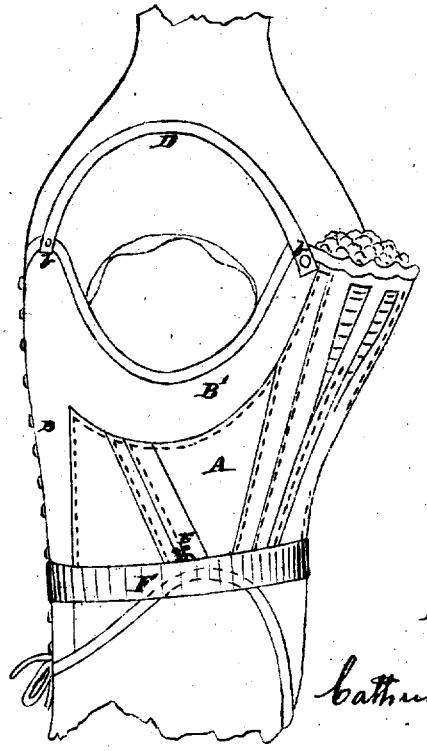

Figure 1 represents a back view of my back and skirt supporter. Fig. 2 represents a side view. Fig. 3 represents a front view. Fig. 4 represents a front view of the steel stays, inclosed in the edges of the garment, for securing the two parts together in front; and Fig. 5 represents an edge view of the same.

To enable those skilled in the art to which my invention belongs to make and use the same, I will proceed to describe it more in detail.

The object desired to be attained is to produce a waistcoat or corset made in two parts, and clasped or laced together in front and back, and so shaped as to closely, neatly, and easily fit and support the body, and so that when the lacing is tightened the front of the shoulders will be drawn back more or less, as desirable, greatly to the support and comfort of the person; also, to support the clothes or skirts, &c., which usually are supported by the hips. The nature of my invention consists in certain improvements in corsets, as will be hereafter described.

In the drawing, the parts marked A A represent the two sides of the corset, which are provided at their back edges with metallic stays B secured in the fabric, and having eyelet-holes *a* to receive the cord or lacing C, which joins the two parts A A at the back, and by the use of which the upper and lower portions or ends can be properly adjusted to fit the form of the wearer. The upper ends of the metallic stays B B may be extended forward along the top of the corset, as shown at C, so as to form a support to the body beneath the arms and back of the shoulder. By the use of steel stays in the rear part of the corset the back is supported in a very thorough manner, and any tendency of the wearer to become round-shouldered is, in a great measure, corrected. Elastic shoulder-straps D D are arranged to pass over the shoulders of the wearer, and their ends properly secured to the upper part of the corset at the front and rear, as indicated at *b*. These elastic straps D prevent the corset from working downward from its own tendency or from the weight of the clothing. It will also be observed that the rear ends of the straps D D are secured to the upper ends of the metallic stays B B, whereby the latter are sustained in proper positions to give the desired support to the back and shoulders. This is an important feature in my invention, and one, too, which will be appreciated by the trade and those accustomed to use or wear corsets. A series of hooks, E, is arranged at proper intervals around the waist of the corset, upon which are caught the metallic loops or eyes of the waistband F. The band F shows the manner in which the clothes may be secured to the waistcoat or corset, and thus avoid a weight resting upon the hips, which latter is very tiresome and quite injurious to the health. The parts A A are secured to each other at the front by metallic stays G G set in the fabric, one of which is provided with studs *e* and the other with loops *f*, so that the two can readily be fastened and unfastened as the corset is put on or taken off.

By the use of the within-described improvements it is believed that health and comfort will be greatly promoted.

Having described my improvements in back and skirt supporting corsets, what I claim therein as my invention, and desire to secure by Letters Patent, is—

1. A corset, open before and behind and adjustable in the back, provided with shoulder-straps attached directly to the metallic back-supports extending from the top to the bottom of the back edges, substantially as and for the purposes herein described.

2. A bodice made upon a metallic form, opening before and behind, adjustable in the rear, and having shoulder-straps and fastenings for the support of the skirts, substantially as shown and described.

CATHRINE ALLSOP GRISWOLD.

Witnesses:

THOS. H. DODGE,

MARY COCKELL.